March 6, 1962 G. LORY 3,023,505
AREA MEASURING INSTRUMENT
Filed April 22, 1958 2 Sheets-Sheet 1

INVENTOR.
GEORGE LORY
BY J. F. Cuneo
ATTORNEY

March 6, 1962 G. LORY 3,023,505
AREA MEASURING INSTRUMENT
Filed April 22, 1958 2 Sheets-Sheet 2

INVENTOR.
GEORGE LORY
BY J. F. Cuneo
ATTORNEY 3,023,505
AREA MEASURING INSTRUMENT
George Lory, 2134 Redcliff, Los Angeles, Calif.
Filed Apr. 22, 1958, Ser. No. 730,184
14 Claims. (Cl. 33—122)

This invention relates to measuring instruments such as planimeters, integrators and other instruments that utilize a rotatably mounted wheel or dial with indicia and a zero reference point and in particular to a novel combination for positively and automatically returning the zero mark of a wheel or dial indicia to the zero reference point whenever the wheel or dial is to be reset at the commencement of a new operation.

Several types of mechanisms for returning the zero mark of a reference wheel or dial to the zero reference point have been disclosed and described in the prior art. The majority of these devices use some type of cam and follower arrangement in which one of the elements is activated by means of a lever or plunger, the activation of the one element causes the cooperating element to return the wheel to which it is attached to the zero reference point. Such mechanisms are generally complicated, expensive to manufacture and are often quite delicate, requiring careful handling at all times to prevent damage to the mechanism.

Another undesirable feature often inherent in such devices as have been disclosed by the prior art is that they sometimes fail to function properly because one of the cams may be resting at dead center when contacted by the cooperating element and as a result cannot be moved. Should this occur and the operator fail to notice the difficulty, any reading taken from this position will be incorrect.

A purpose of this invention is to provide a combination for resetting measuring wheels and the like to zero that eliminates costly, complicated and delicate mechanisms and uses instead a simple positive and automatic zeroing combination.

Another purpose of this invention is to provide a novel zeroing combination for use in connection with measuring wheels, dials, and similar devices that will not permit the measuring wheel or other indicating device to remain at dead center when it is to be reset and will always return the indicator mark to the zero reference point regardless of the position of the index mark at the time the instrument has completed making a measurement.

A related purpose is to provide a zero setting combination that will automatically restore the zero point of the indicia of a measuring wheel or dial to the zero reference point by simply raising the rim of the measuring wheel clear of the surface that is being measured at the end of such measurement, thereby reducing the time required to reset the instrument to a minimum.

An additional purpose is to provide a zero resetting combination that after having returned the measuring wheel to zero will hold the wheel at zero on the reference point until the operator is ready to commence a new measuring operation.

I accomplish these purposes by incorporating in a measuring wheel, dial or other wheel mounted rotatably in a body, a permanent magnet. Such magnets are preferably cylindrical, although other suitable forms of magnets may be used. Such a magnet is secured to the shaft of a measuring wheel so that its longitudinal axis preferably intersects the longitudinal axis of the shaft supporting the measuring wheel or dial at substantially a right angle, that is it would pass diametrically through such a shaft at some convenient point.

A cooperating permanent magnet, having preferably the same cross section as that of the magnet secured to the shaft, is fixedly attached to the body member that supports the measuring wheel shaft. This cooperating magnet is mounted in the body member so that one of its poles will be in cooperating spaced relationship with the poles of the magnet attached to the particular shaft. Several arrangements of permanent magnets may be employed for accomplishing the zeroing action as will be shown in detail hereafter. Likewise it is possible as stated above to employ other forms of magnets than those having a cylindrical form.

Since the dial shaft in a planimeter or integrator is ordinarily coupled with a worm mounted on the measuring wheel shaft, it becomes necessary to disengage the worm gear mounted on the dial shaft from the worm before the dial shaft is free to revolve and permit the dial to assume its zero position. The dial shaft is supported between shaft bearings so the worm gear is disengaged by making the dial shaft support movable normal to the axis of the worm, between fixed limits. The dial shaft support is made to slide up or down on the body member depending on the particular construction employed, and this permits the worm gear to become disengaged from the worm.

A permanent magnet is attached to the dial shaft in a manner similar to that in which the magnet is attached to the measuring wheel shaft. Another permanent magnet is fixedly secured to the framework of the sliding dial shaft support at a position where it can cooperate with but not touch the ends of the magnet secured to the dial shaft. If desired the ends of the magnet secured to the dial shaft could be acted upon by the fixed magnet secured to the body of the instrument that cooperates with the magnet secured to the measuring wheel shaft, provided that this magnet is located at a suitable position.

The locking of the measuring wheel shaft after it has been returned to the zero position is accomplished by means of a suitable lever arrangement that may also be used to raise the sliding dial shaft support if desired.

The above and subsequent description of the various embodiments of the device will be more clearly understood by referring to the accompanying drawings in which.

Figure 9:
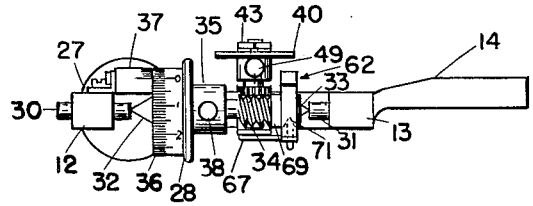
FIG. 9 is an elevation view of the planimeter body and lever shown in FIG. 8.
Figure 11:
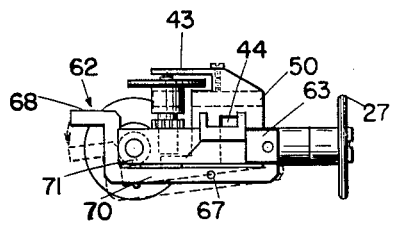
Figure 10:
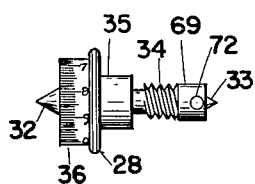
FIG. 10 is a plan view of a measuring wheel shaft including a conical depression on the shaft to permit the corresponding element of the locking lever shown in FIG. 9 to engage it and prevent the shaft from rotating until the operator is ready to make a measurement.

FIG. 11 is an end elevation view of the body shown in FIG. 9. This view shows the lever in the up position with the dotted lines showing the position of the lever when it is released. This view shows how the lever can be used to correctly set the zero point of the measuring wheel indicia by moving the lever yoke in or out from the body member.

Figure 1:
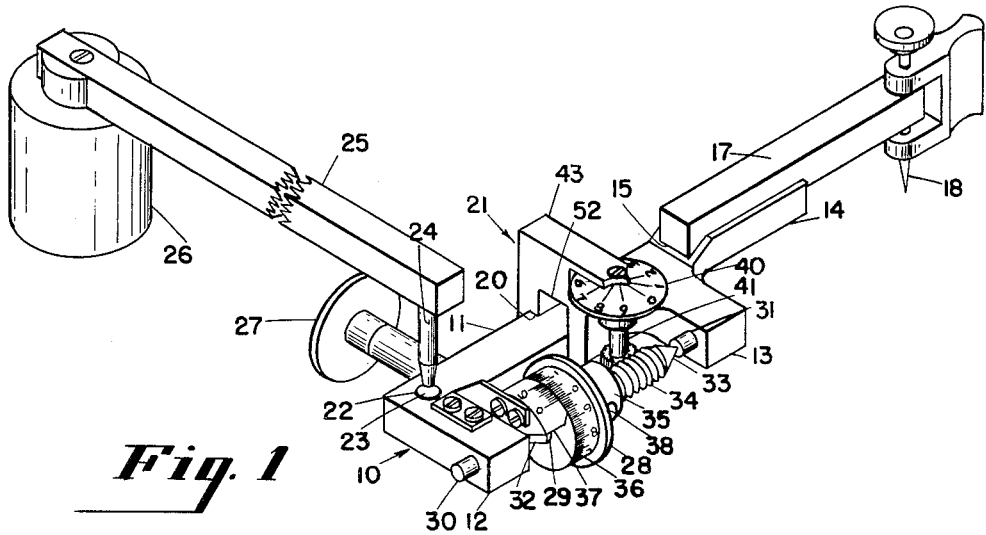
FIG. 1 is an isometric view of one form of planimeter equipped with a magnetic zeroing combination and provided with a sliding dial shaft support. The dial shaft support is raised and clearly shows the position of the groove in the body member against which it slides, this view includes a conventional tracer point and arm and a conventional pole weight and pole arm.

Referring to the drawings which are exemplary of various embodiments of this invention, there is shown in FIG. 1 a conventional planimeter having a body portion 10 consisting essentially of a longitudinal portion 11 from which extend lateral arms 12 and 13. Longitudinal portion 11 is continued beyond arm 13 by a slightly raised extension 14 that is substantially in the form of a channel 15. The lower surface of channel 15 is provided with an elongated slot 16 that extends through the bottom. A tracer arm 17 seats in channel 15 and may be positioned longitudinally with respect to body member 10. The position of tracer point 18 is shifted until the instrument gives the correct reading when the tracer has followed the outline of a known area and then the tracer arm is secured in channel 15 by means of a locking screw 19 that seats against the bottom of channel 15 and passes through slot 16 threading into tracer arm 17.

Longitudinal portion 11, between arms 12 and 13 is provided with a vertical slot 20 extending from the top to the bottom of that portion of the body, this slot receives the cooperating portiton of a dial shaft support 21 and permits the support to slide upwardly or downwardly therein.

Planimeter body 10 is also provided with a substantially spherical socket 22 adapted to receive the cooperating end 23 of extension 24 usually attached to one end of pole arm 25. Pole weight 26 is attached to the other end of pole arm 25 in the conventional manner.

A roller 27 extends outwardly from portion 11 and is mounted so that the axis of the roller is parallel to the plane surface supporting the planimeter.

Measuring wheel 28 is mounted on a shaft 29 that is rotatably supported between bearings 30 and 31 whose longitudinal axes are parallel to the longitudinal axis of portion 11. These bearings are supported in appropriate retaining holes located in arms 12 and 13 respectively. Both ends 32 and 33 of the measuring wheel shaft are conical and terminate in sharp points; the apex of each cone seats in its respective bearing 30 and 31. Measuring wheel shaft 29 is provided with a worm 34 that is coaxial with the shaft and adjoins conical end 33 in FIGS. 1, 2, 4, and 5. A hub 35 adjoins the measuring wheel and worm and the opposite side of the measuring wheel is provided with a numbered annulus 36 secured to the shaft by any suitable means such as threads or a pin. An index and vernier segment 37 is attached to arm 12 by a suitable bracket and is positioned to adjoin but not touch numbered annulus 36 of the measuring wheel.

Figure 2:
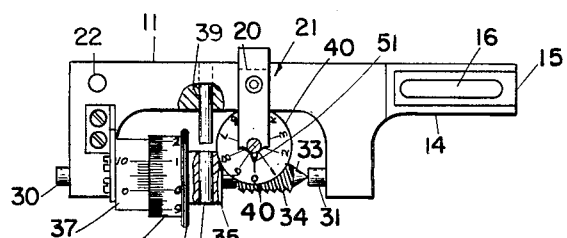
FIG. 2 is a top plan view of a planimeter body such as shown in FIG. 1 equipped with a magnetic zeroing mechanism for returning the measuring wheel to zero. The drawing is partly in cross section to more clearly illustrate the arrangement of permanent magnets.

FIGS. 1 and 2 show hub 35 provided with a cylindrical permanent magnet 38 that extends diametrically through hub 35 so that its positive pole is at one end of a diameter and its negative pole is at the opposite end of the diameter thus placing the axis of the magnet substantially normal to the axis of the measuring wheel shaft 29.

A second cylindrical magnet 39 is positioned and secured in longitudinal portion 11 of body 10 so that one of its poles is adjacent to, but does not touch the ends of magnet 38. Magnet 39 is held in place by a set screw or other suitable fastening means. Since like poles repel each other and unlike poles attract each other the opposite poles of magnets 38 and 39 are permitted to attract each other and when in this position the annulus in the measuring wheel shaft is set to read zero on the vernier and is then secured in this position. Turning the measuring wheel shaft 180° to what would normally be dead center, would place the like poles facing each other, since these will always repel each other whenever the shaft is free to rotate the shaft will turn and allow the unlike poles to attract each other and thus return the measuring wheel indicia to zero.

The conventional planimeter is usually provided with a dial 40 that records the number of complete revolutions made by the measuring wheel. Dial 40 is mounted on a shaft 41 and the shaft is supported so that the longitudinal axis of the shaft will be normal to the axis of the measuring wheel shaft. A worm gear 42 is secured to shaft 41 and when it is properly positioned this gear will cooperate with worm 34. In the conventional planimeter or integrator shaft 41 is supported between bearings that are held in spaced relationship with each other by a dial shaft supporting frame that is fixedly secured to the body of the planimeter at the proper position.

Since in the present device it is desired to also return the dial to zero whenever the measuring wheel is reset, it is necessary that the worm gear 42 become disengaged from worm 34 in order that it will be free to assume the zero position. This is accomplished in FIGS. 1, 2, 3 and 4 by rotatably mounting the dial shaft 41, dial 40 and worm gear 42 in a sliding dial shaft support 43. Movement of the support either upwardly or downwardly when mounted in slot 16 of longitudinal portion 11 will permit engagement or disengagement of worm gear 42 respectively. In FIGS. 1, 2, 3, and 4 the dial shaft support will move toward body 10 whenever the instrument is lifted so that the measuring wheel and the bottom of sliding dial shaft support are clear of the surface. Dial shaft support 43 is provided with a slot 44 that extends parallel to the dial shaft and is proportioned to snugly but freely slide in slot 20 in longitudinal portion 11. Support 43 is prevented from becoming separated from the body proper by means of a large headed screw 45 that threads into the lower surface of dial shaft support 43 at a position so that a portion of the head extends into slot 44.

The lower surface of sliding dial shaft support is provided with a surface contacting screw 46 that is preferably round headed. The position of the end of this screw is adjusted to insure that worm gear 42 makes proper engagement with the worm whenever the sliding dial shaft support screw is resting on the surface and the measuring wheel is also on the surface; the screw threads into threads 47, in the suitably positioned bore.

Figure 3:
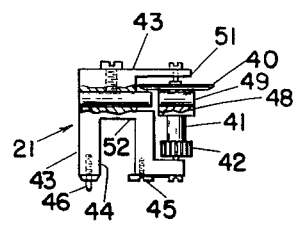
FIG. 3 is an elevation view of a sliding dial shaft support such as shown in FIG. 1, partly in cross section to illustrate one arrangement of permanent magnets for returning the dial to zero whenever the dial shaft is free to rotate on its bearings.

In FIG. 3 dial 40 is mounted on hub 48 and the hub is provided with a cylindrical permanent magnet 49 that extends diametrically through hub 48 at right angles to the longitudinal axis of shaft 41. A cooperating magnet 50 is secured to sliding dial shaft support 43 at a position where its end can cooperate with the poles of magnet 49. This is accomplished by placing one pole of magnet 50 near to but not touching the ends of permanent magnet 49. Whenever the dial shaft is free to turn on its bearings, the unlike poles of the magnets will attract each other and when the dial shaft is in this position the indicia of the dial is set to correspond with the zero reference point 51. It is preferable that where magnets such as 39 and 50 are employed to attract the measuring wheel and dial magnets, that the acting pole of both of these magnets have the same polarity. If desired a single fixed magnet 39 could be used to act upon both magnets 38 and 49, in which case the zero point of the dial indicia would have to be reset accordingly.

When dial shaft support 43 is lifted from the surface so that screw 46 is clear of the plane of measurement, support 43 will slide downwardly until end 52 of slot 44 rests against the surface of longitudinal portion 11. When this occurs the worm gear is free of worm 34 and the dial shaft magnet will rotate the shaft to its cooperating position with the fixed magnet.

Figure 5:
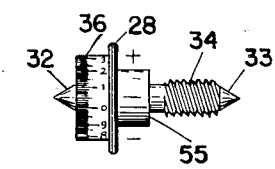
FIG. 5 is an elevation view of a planimeter measuring wheel wherein the shaft that rotatably supports the measuring wheel is provided with an annular magnet in place of the diametrically secured cylindrical magnet of FIGS. 1 and 2.
Figure 6:
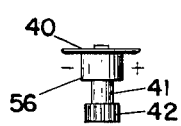
FIG. 6 is a plan view of a dial shaft provided with an annular magnet in place of the cylindrical magnet shown in FIG. 3.
Figure 7:
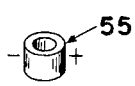
FIG. 7 is an isometric view of the annular magnets shown in FIGS. 5 and 6 having its north and south pole on the circumference at opposite ends of a diameter.

FIG. 7 shows an annular form of magnet 55 that is available on the market. These magnets are designed so that their positive and negative poles are located at diametrically opposite positions on the circumference of the cylinder and not on the axial ends as usual. The central bore of the magnet is provided with threads or other suitable means for fixedly securing it to a shaft. FIG. 5 shows one of these ring magnets taking the place of hub 35 on the measuring wheel shaft such as shown in FIG. 2. FIG. 6 shows another annular magnet 56 replacing the hub on shaft 41 of FIG. 3. The fixed magnets 39 and 50 would be used in these embodiments to act on cylindrical magnets 55 and 56 since these will cooperate with the annular type of magnets as well.

Figure 4:
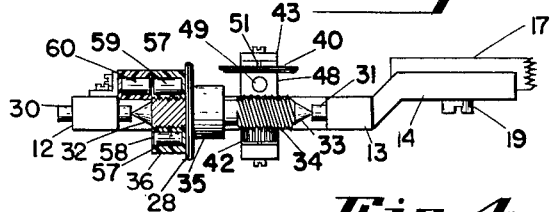
FIG. 4 is an elevation of the planimeter body shown in FIG. 2, partly in cross section to illustrate one alternative arrangement of magnets for returning the measuring wheel index mark to zero.

FIG. 4 shows an alternative arrangement of magnets that may be employed for returning the measuring wheel indicia to zero. In this embodiment the numbered annulus secured to measuring wheel shaft 29 is provided with holes 57 located at diametrically opposed positions with the axes of the holes symmetrically positioned from the center of the annulus. Into holes 57 are inserted small magnets 58 and 59. The positive or negative end of magnet 58 is on the flat surface of the numbered annulus that is away from the measuring wheel proper. The opposite pole of magnet 59 lies on the same surface. A permanent magnet 60 is preferably fixedly mounted in the zero indication vernier segment at a position where it will best cooperate with the ends of magnets 58 and 59. Since the adjacent pole of either magnet 58 or 59 is opposite to that of magnet 60 in polarity, the pole of magnet 60 will attract one and repel the other. A single magnet 58 could be used in the numbered annulus of measuring wheel 28 in which circumstance the ends of magnet 58 and 60 that are adjacent to each other would have to be opposite. In such an arrangement there is the possibility that when magnet 58 and magnet 60 are at their most remote positions the system would not be sensitive enough to insure peak performance.

Under some conditions it is possible that after the magnets have reset the measuring wheel to zero the wheel could be moved from its zero position before the operator is ready to commence tracing an area. To overcome this difficulty there is shown an alternative embodiment, one form of which is illustrated in FIGS. 8, 9, 10 and 11. This embodiment includes a locking device that prevents the measuring wheel from rotating before the operator is ready to start making a measurement. This construction utilizes most of the essential parts of the instrument shown in FIGS. 1, 2, 3 and 4, with the exception that the sliding dial shaft support 43 is normally positioned so that the upper end of slot 44 is in contact with the upper surface of slotted longitudinal portion 11 when the worm gear is in mesh with worm 34 and is disengaged from the worm whenever the sliding dial shaft support is raised at which time magnets 49 and 50 are free to act upon each other and return the dial to zero.

Figure 8:
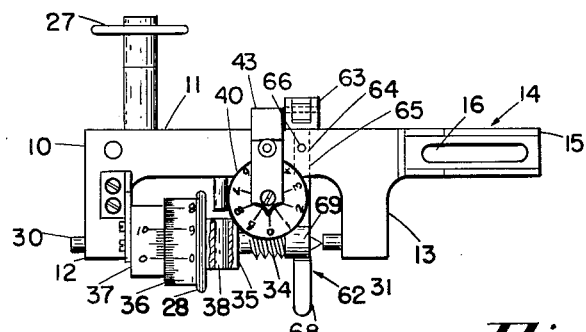
FIG. 8 is a top plan view of a planimeter body equipped with a locking lever which also serves as a zero setting adjusting device.

In FIGS. 8, 9, and 11 sliding dial shaft support 43 is raised by lifter bar 67 secured to the side of lever 62 that is hingedly connected at one end to a yoke 63. Yoke 63 is secured to the side of longitudinally extending portion 11 that is away from the operator by any suitable means such as a cylindrical extension 64 that slips snugly into a bore 65. When properly positioned extension 64 is securely held in place by a suitable locking device such as a set screw 66. Lever 62 is roughly U-shaped to permit it to extend below longitudinal portion 11 and measuring wheel shaft 29. That portion of lever 62 closest to the operator is provided with a short handle 68; whenever handle 68 is raised lifter 67 pushes against the lower surface of sliding dial shaft support 43 and causes it to rise.

Measuring wheel shaft 29 in this embodiment is provided with the conventional worm 34 but the length of this worm is shorter than that shown in FIGS. 1, 2, and 4, and shaft 29 is provided with a coaxial cylindrical portion that extends between the end of worm 34 and conical end 33. The diameter of cylinder 69 is approximately the same as that of the maximum diameter of worm 34. Portion 70 of U-shaped lever 62 is provided with a preferably conical headed pin 71 secured to the lever at a position where its axis will be substantially directly below the longitudinal axis of shaft 29. Cylindrical portion 69 is provided with a cooperating conical depression 72 positioned on the cylindrical portion so that it will engage pin 71 whenever the indicia of the measuring wheel is at or very close to zero of the indicator, when the handle of lever 62 is lifted. As long as pin 71 and depression 72 are in contact with each other the measuring wheel cannot rotate. When the operator is ready to start making another measurement he simply releases the handle and the lever drops to the position shown by the dotted lines in FIG. 11. By shifting extension 64 in or out in hole 65 before set screw 66 is locked against extension 64, it is possible by holding pin 71 in contact with depression 72, to shift the zero position of the indicia of the measuring wheel until the zero point of the indicia accurately coincides with the zero reference point of the vernier indicator.

If desired a lever 62 could be incorporated in the planimeter shown in FIGS. 1, 2, and 4 by supplying the measuring wheel shaft with a corresponding cylindrical portion between the worm and the conical end, however, since sliding dial support 43 of this instrument drops to become disengaged it would not require lifter 67, and the lever would only serve to hold the measuring wheel shaft from turning.

The manner in which the device shown in FIGS. 1, 2, 3 and 4 operates is as follows: during the measurement of an area measuring wheel 28, roller 27, tracer 18 and pole weight 26 as well as adjustment screw 46 are all in contact with the surface. When the measurement has been taken the readings of the measuring wheel and dial are recorded and the measuring wheel is lifted clear of the surface and sufficiently high to permit dial shaft support 43 to slide downwardly until the upper end of slot 44 rests on the upper surface of longitudinal portion 11. Both the dial and measuring wheel are free to rotate and the dissimilar poles of magnets 38 and 39 will attract each other while the dissimilar poles of magnets 49 and 50 will likewise attract each other returning both the measuring wheel and dial to the reference mark. The instrument is then again placed on the surface and the measuring wheel is ready to start making a new area measurement.

The operation of the device shown in FIGS. 8, 9 and 11 is quite similar. The principal difference is that the measuring wheel is raised only enough to permit it to clear the surface and at the same time the operator raises the handle of lever 62. As soon as the magnets pull the measuring wheel to its zero position, the raising of the lever will insert conical pin 71 in depression 72 and at the same time lifter bar 67 will raise sliding dial shaft support 43 enabling dial 40 to resume its zero position. The instrument is then replaced on the surface and when the operator is ready to start a new measurement he simply releases lever 62 and it will drop against the surface releasing the measuring wheel shaft. From the above description it is readily apparent that by utilizing a combination of magnets such as described heretofore any rotatably supported shaft can be returned to its zero starting position easily and quickly whether the shaft be that of a planimeter, integrator or that of any other instrument so mounted and having a starting reference point.

While the invention has been described in detail with respect to illustrative examples and embodiments of the invention it will be understood by those skilled in the art that various changes and modifications may be made without departing from the spirit and scope of the invention and it is intended therefore to cover all such changes and modifications in the appended claims.

I claim:

1. In an area measuring instrument provided with a measuring wheel with indicia and a zero reference point for said wheel, the measuring wheel in operation rolling along the surface being measured, the combination of: a body member; a shaft rotatably mounted in said body member; means operably connecting the shaft with the wheel; a first permanent magnet secured to the operably connected wheel and shaft; and a second permanent magnet fixedly supported by the body member at a position wherein one of the poles of the second magnet is in cooperating spaced relationship with the pole of opposite polarity of said first magnet, means operative in response to raising said measuring wheel clear of the surface being measured to disconnect said measuring wheel from said shaft, whereby said first and second permanent magnets may coact to return the measuring wheel with indicia to the zero reference point.

2. In an area measuring instrument provided with a measuring wheel with indicia and a zero reference point for said wheel, the measuring wheel in operation rolling along the surface being measured, the combination of: a body member; a shaft rotatably mounted in said body member; means operably connecting the shaft with the wheel; a first permanent magnet secured to the operably connected wheel and shaft, said magnet being positioned so that its longitudinal axis is normal to the axis of the operably connected wheel and shaft; and a second permanent magnet fixedly supported by the body member at a position wherein one pole of said second magnet is in cooperating spaced relationship with the pole ends of said first magnet; and means operative in response to the raising of said measuring wheel clear of the surface being measured to disconnect said measuring wheel from said shaft, whereby said first and second permanent magnets may coact to return the measuring wheel with indicia to the zero reference point.

3. In an area measuring instrument provided with a measuring wheel with indicia and a zero reference point for said wheel, the measuring wheel in operation rolling along the surface being measured, the combination of: a body member; a shaft rotatably mounted in said body member; means operably connecting the shaft with the wheel; a first permanent magnet secured to the wheel with indicia; a second permanent magnet secured to the wheel with indicia, the axes of the first and second magnets being parallel to the axis of said wheel and shaft, the first and second magnets being positioned on opposite sides of the center of said wheel axis on a diameter passing normal thereto, the pole of the first magnet, adjacent the wheel, being opposite in polarity to that of the pole of the second magnet adjacent said wheel; and a third permanent magnet fixedly supported by said body member, one pole of the third magnet being in cooperating spaced relationship with the proximate pole ends of the first and second magnets, means operative in response to the raising of said measuring wheel clear of the surface being measured to disconnect said measuring wheel from said shaft, whereby the first and second permanent magnets may coact with said third permanent magnet to return the measuring wheel with indicia to the zero reference point.

4. In an area measuring instrument provided with a measuring wheel with indicia and a zero reference point for said wheel, the measuring wheel in operation rolling along the surface being measured, the combination of: a body member; a shaft rotatably mounted in said body member; means operably connecting the shaft with the wheel; a first cylindrical permanent magnet secured to the operably connected shaft and wheel; a second cylindrical permanent magnet fixedly supported by the body member at a position wherein one of the poles of the second magnet is in cooperating spaced relationship with the pole of opposite polarity of said first magnet, means operative in response to raising said measuring wheel clear of the surface being measured to disconnect said measuring wheel from said shaft, whereby said first and second cylindrical permanent magnets may coact to return the measuring wheel with indicia to the zero reference point.

5. In an area measuring instrument provided with a measuring wheel with indicia and a zero reference point for said wheel, the measuring wheel in operation rolling along the surface being measured, the combination of: a body member; a shaft rotatably mounted in said body member; means operably connecting the shaft with the wheel; a first annular permanent magnet secured to the operably connected shaft and wheel, said magnet being coaxial with the axis of the shaft and wheel, the positive and negative poles of said annular magnet being on opposite sides of the circumference of the magnet and not at the axial ends; a second permanent magnet fixedly supported by the body member at a position wherein one of its poles is in cooperating spaced relationship with the poles of the first annular magnet; and means operative in response to raising said measuring wheel clear of the surface being measured to disconnect said measuring wheel from said shaft, whereby said first annular permanent magnet and said second permanent magnets may coact to return the measuring wheel with indicia to the zero reference point.

6. In an area measuring instrument provided with a measuring wheel and dial with indicia and a zero reference point for each of said wheel and dial, the measuring wheel in operation rolling along the surface being measured, the combination of: a body member; a shaft rotatably mounted in said body member; means operably connecting the shaft with the wheel; a dial shaft supporting member; a dial shaft rotatably mounted on the dial shaft supporting member, the longitudinal axis of the dial shaft being normal to the longitudinal axis of the wheel and shaft, said dial shaft supporting member being slidably mounted on said body member at a position where the dial shaft may cooperate with the shaft, the movement of the dial shaft supporting member being normal to the axis of the wheel and shaft; means for operably connecting the dial with the dial shaft; means for operably engaging and disengaging the wheel shaft and dial shaft as the dial shaft supporting memebr slides on said body member; a first permanent magnet secured to the operably connected wheel and shaft; a second permanent magnet fixedly supported by the body member at a position wherein one pole of the second magnet is in cooperating spaced relationship with the pole of opposite polarity of the first magnet; a third permanent magnet secured to the operably connected dial and dial shaft; and a fourth permanent magnet fixedly secured to said dial shaft supporting member at a position where one pole of the fourth magnet is in cooperating spaced relationship with the pole of opposite polarity of the third magnet, said dial shaft supporting member being operative in response to raising said measuring wheel clear of the surface being measured to disconnect said measuring wheel shaft from said dial shaft, whereby said first and second permanent magnets may coact to return the measuring wheel with indicia to its zero reference point, and said third and fourth permanent magnets may coact to return the dial with indicia to its zero reference point.

7. In an area measuring instrument provided with a measuring wheel and a dial with indicia and a zero reference point for each of said wheel and dial, the measuring wheel in operation rolling along the surface being measured, the combination of: a body member; a shaft rotatably mounted in said body member; means operably connecting the shaft with the wheel; a dial shaft supporting member; a dial shaft rotatably mounted on the dial shaft supporting member, the longitudinal axis of the dial shaft being normal to the longitudinal axis of the wheel and shaft, said dial shaft supporting member being slidably mounted on said body member at a position where the dial shaft may cooperate with the shaft, the movement of the dial shaft supporting member being normal to the axis of the wheel and shaft; means for operably connecting the dial and dial shaft; means for operably engaging and disengaging the wheel shaft and the dial shaft as the dial shaft supporting member slides on said body member; a first permanent magnet secured to the operably connected wheel and shaft, said magnet being positioned so that its longitudinal axis is normal to the axis of the operably connected wheel and shaft; a second permanent magnet fixedly supported by the body member at a position where one of its poles is in cooperating spaced relationship with the pole ends of the first magnet; a third permanent magnet secured to the operably connected dial and dial shaft, said third magnet being positioned so that its longitudinal axis is normal to the axis of the operably connected dial and dial shaft; and a fourth permanent magnet fixedly supported by the dial shaft supporting member at a position where one of its poles is on cooperating spaced relationship with the pole ends of the third magnet, said dial shaft supporting member being operative in response to raising said measuring wheel clear of the surface being measured to disconnect said measuring wheel shaft from said dial shaft, whereby said first and second permanent magnets may coact to return the measuring wheel with indicia to its zero reference point, and said third and fourth permanent magnets may coact to return the dial with indicia to its zero reference point.

8. An area measuring instrument according to claim 7 wherein the first, second, third and fourth permanent magnets are cylindrical magnets having a positive pole at one end and a negative pole at the opposite end.

9. An area measuring instrument according to claim 7 wherein the first and third magnets are annular permanent magnets coaxially mounted on the shaft and the dial shaft respectively, the positive and negative poles of said annular magnets being on opposite sides of the circumference of the magnet and not at the axial ends, and wherein the second and fourth permanent magnets are cylindrical magnets having the positive and negative poles thereof at the opposite axial ends thereof.

10. An area measuring instrument according to claim 7 wherein the second and fourth permanent magnets have poles of identical polarity to cooperate with the pole ends of the first and third permanent magnets.

11. In an area measuring instrument provided with a measuring wheel and a dial with indicia and a zero reference point for each of said wheel and dial, the measuring wheel in operation rolling along the surface being measured, the combination of: a body member; a shaft rotatably mounted in said body member; means operably connecting the shaft with the wheel; a dial shaft supporting member; a dial shaft rotatably mounted on the dial shaft supporting member, the longitudinal axis of the dial shaft being normal to the longitudinal axis of the wheel and shaft, said dial shaft supporting member being slidably mounted on said body member at a position where the dial shaft may cooperate with the shaft, the movement of the dial shaft supporting member being normal to the axis of the wheel and shaft; means for operably connecting the dial and dial shaft; means for operably engaging and disengaging the wheel shaft and dial shaft as the dial shaft supporting member slides on said body member; a first permanent magnet secured to the operably connected wheel and shaft; said magnet being positioned so that its longitudinal axis is normal to the axis of the operably connected wheel and shaft; a second permanent magnet secured to the operably connected dial and dial shaft, said second magnet being positioned so that its longitudinal axis is normal to the axis of the operably connected dial and dial shaft; and a third permanent magnet fixedly supported by the body member at a position where one of its poles is in cooperating spaced relationship with the pole ends of the first magnet and the pole ends of the second magnet, said dial shaft supporting member being operative in response to raising said measuring wheel clear of the surface being measured to disconnect said measuring wheel shaft from said dial shaft, whereby said first and third permanent magnets may coact to return the measuring wheel with indicia to its zero reference point, and said second and third permanent magnets may coact to return the dial with indicia to its zero reference point.

12. In an area measuring instrument provided with a wheel with indicia and a zero reference point for said wheel, the combination of: a body member; a shaft rotatably mounted in said body member; means operably connecting the shaft with the wheel; a first magnet secured to the operably connected wheel and shaft, said magnet being positioned so that its longitudinal axis is normal to the axis of the operably connected wheel and shaft; a second magnet fixedly supported by the body member at a position wherein one pole of the second magnet is in cooperating spaced relationship with the pole ends of the first magnet; a lever hingedly supported at one end by the body member, said lever being positioned transversely to the axis of the shaft, below said shaft, and continuing beyond the shaft; a projection extending from the lever in the direction of the shaft; a recess on said shaft adapted to become engaged by said projection when the lever is moved toward the shaft and the wheel and shaft are in zero position, and become disengaged when the lever is moved away from the shaft.

13. An area measuring instrument according to claim 12 wherein the lever is adjustable transversely to bring the wheel and shaft in correct zero alignment with the zero reference mark when said projection and recess are in full engagement with each other.

14. In an area measuring device provided with a wheel and a dial with indicia and a zero reference point for each of said wheel and dial, the combination of: a body member; a shaft rotatably mounted in said body member; means operably connecting the shaft with the wheel; a dial shaft supporting member; a dial shaft rotatably mounted in the dial shaft supporting member, the longitudinal axis of the dial shaft being normal to the longitudinal axis of the wheel and shaft, said dial shaft supporting member being slidably mounted on said body member at a position where the dial shaft may cooperate with the shaft, the movement of the dial shaft supporting member being normal to the axis of the wheel and shaft; means for operably connecting the dial and dial shaft, means for operably engaging and disengaging the wheel shaft and dial shaft as the dial shaft supporting member slides on said body member; a first magnet secured to the operably connected wheel and shaft, said magnet being positioned so that its longitudinal axis is normal to the axis of the operably connected wheel and shaft; a second magnet fixedly supported by the body member at a position where one of its poles is in cooperating spaced relationship with the pole ends of the first magnet; a third magnet secured to the operably connected dial and dial shaft, said magnet being positioned so that its longitudinal axis is normal to the axis of the operably connected dial and dial shaft; a fourth magnet fixedly supported by the dial shaft supporting member at a position where one of its poles is in cooperating spaced relationship with the pole ends of the third magnet; a lever hingedly supported at one end by the body member, said lever being positioned transversely to the axis of the shaft, below said shaft, and continuing beyond the shaft; a projection extending from the lever in the direction of the shaft; a recess in said shaft adapted to become engaged by said projection when the lever is moved toward the shaft and the wheel and shaft are in substantially zero position, and become disengaged when the lever is moved away from the shaft; and a lifter secured to the lever extending laterally therefrom, said lifter being positioned below the dial shaft supporting member and adapted to raise the dial shaft supporting member when the lever is moved toward the shaft and lower the dial shaft supporting member when the lever is moved away from the shaft, thereby disengaging and engaging the dial shaft from the shaft and permitting the third and fourth magnets to return the dial to its zero reference point.

References Cited in the file of this patent

UNITED STATES PATENTS

| | | |
|---|---|---|
| 931,774 | Krueger | Aug. 24, 1909 |
| 2,864,170 | Wiedemann | Dec. 16, 1958 |

FOREIGN PATENTS

| | | |
|---|---|---|
| 734 | Great Britain | 1900 |
| 63,626 | Austria | Feb. 25, 1914 |
| 558,185 | Germany | Sept. 3, 1932 |
| 811,622 | Germany | Aug. 23, 1951 |